(12) United States Patent
Alano et al.

(10) Patent No.: US 9,714,598 B2
(45) Date of Patent: Jul. 25, 2017

(54) MIXER WITH INTEGRATED DOSER CONE

(71) Applicant: Faurecia Emissions Control Technologies, USA, LLC, Columbus, IN (US)

(72) Inventors: Eduardo Alano, Columbus, IN (US); Blake Lee McPeek, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 15/132,473

(22) Filed: Apr. 19, 2016

(65) Prior Publication Data

US 2016/0319724 A1    Nov. 3, 2016

Related U.S. Application Data

(63) Continuation-in-part of application No. 14/737,546, filed on Jun. 12, 2015.

(Continued)

(51) Int. Cl.
*F01N 3/00* (2006.01)
*F01N 3/28* (2006.01)
(Continued)

(52) U.S. Cl.
CPC .......... *F01N 3/2892* (2013.01); *B01D 53/94* (2013.01); *B01F 3/04049* (2013.01);
(Continued)

(58) Field of Classification Search
CPC ..... F01N 3/00; F01N 3/28; F01N 3/20; B01D 53/94; B01F 3/04; B01F 5/06
(Continued)

(56) References Cited

U.S. PATENT DOCUMENTS 5,606,856 A    3/1997    Linder
6,539,708 B1   4/2003    Hofmann
(Continued)

FOREIGN PATENT DOCUMENTS

DE    4417238    3/2003
DE    19806265   7/2004
(Continued)

OTHER PUBLICATIONS

International Search Report and Written Opinion for International Application No. PCT/US2016/028237 mailed Jul. 28, 2016.
(Continued)

*Primary Examiner* — Tom P Duong
(74) *Attorney, Agent, or Firm* — Barnes & Thornburg LLP

(57) ABSTRACT

A mixer for a vehicle exhaust system includes a mixer housing defining a mixer central axis and having an inlet at an upstream end and an outlet at a downstream end. An upstream baffle is in the housing at the upstream end and includes at least one inlet opening configured to receive engine exhaust gas. A downstream baffle is in the mixer housing at the downstream end such that the downstream baffle is axially spaced from the upstream baffle. The downstream baffle includes at least one outlet opening. A housing opening is formed within the mixer housing at a location between the upstream and downstream baffles, and which is configured to receive a doser. A cone has a cone outlet opening aligned with the housing opening, and an extension portion extends outwardly from a wide end of the cone to provide a wall that surrounds the cone outlet opening.

21 Claims, 16 Drawing Sheets

Related U.S. Application Data

(60) Provisional application No. 62/155,025, filed on Apr. 30, 2015.

(51) Int. Cl.
| | | |
|---|---|---|
| *B01D 53/94* | (2006.01) | |
| *F01N 3/20* | (2006.01) | |
| *B01F 5/04* | (2006.01) | |
| *B01F 5/06* | (2006.01) | |
| *B01F 3/04* | (2006.01) | |

(52) U.S. Cl.
CPC .......... *B01F 5/0473* (2013.01); *B01F 5/0614* (2013.01); *F01N 3/208* (2013.01); *F01N 3/2066* (2013.01); *F01N 2240/20* (2013.01); *F01N 2610/02* (2013.01)

(58) Field of Classification Search
USPC ........................... 60/295, 286, 303; 422/176
See application file for complete search history.

(56) References Cited

U.S. PATENT DOCUMENTS

| | | | | |
|---|---|---|---|---|
| 7,448,206 | B2* | 11/2008 | Meingast | B01F 3/04049 |
| | | | | 239/433 |
| 7,712,305 | B2* | 5/2010 | Kapsos | B01F 3/04049 |
| | | | | 60/282 |
| 8,033,104 | B2* | 10/2011 | Zhang | F01N 3/36 |
| | | | | 60/295 |
| 8,438,839 | B2 | 5/2013 | Floyd | |
| 8,539,761 | B2* | 9/2013 | Lebas | B01F 3/04049 |
| | | | | 366/338 |
| 8,661,792 | B2* | 3/2014 | Greber | F01N 3/2066 |
| | | | | 60/286 |
| 8,800,276 | B2 | 8/2014 | Levin | |
| 9,180,407 | B2 | 11/2015 | De Rudder | |
| 2003/0079467 | A1* | 5/2003 | Liu | B01D 53/86 |
| | | | | 60/286 |
| 2003/0110763 | A1 | 6/2003 | Pawson | |
| 2003/0226412 | A1 | 12/2003 | Rumminger | |
| 2006/0070374 | A1 | 4/2006 | Gaiser | |
| 2006/0218902 | A1 | 10/2006 | Arellano | |
| 2007/0092413 | A1 | 4/2007 | Hirata | |
| 2007/0163241 | A1 | 7/2007 | Meingast | |
| 2007/0193252 | A1 | 8/2007 | McKinley | |
| 2008/0011777 | A1 | 1/2008 | Cooke | |
| 2008/0011780 | A1 | 1/2008 | Cooke | |
| 2008/0022670 | A1 | 1/2008 | Ichikawa | |
| 2008/0092526 | A1 | 4/2008 | Kunkel | |
| 2008/0163612 | A1 | 7/2008 | Gaiser | |
| 2008/0282687 | A1 | 11/2008 | Park | |
| 2009/0044524 | A1 | 2/2009 | Fujino | |
| 2009/0084094 | A1 | 4/2009 | Goss | |
| 2009/0107126 | A1 | 4/2009 | Bugos et al. | |
| 2009/0120066 | A1 | 5/2009 | VanderGriend | |
| 2009/0127511 | A1 | 5/2009 | Bruck | |
| 2010/0005790 | A1 | 1/2010 | Zhang | |
| 2010/0071355 | A1 | 3/2010 | Brown | |
| 2010/0101222 | A1 | 4/2010 | Oesterle | |
| 2010/0186393 | A1 | 7/2010 | Kowada | |
| 2010/0212292 | A1 | 8/2010 | Rusch et al. | |
| 2011/0094206 | A1 | 4/2011 | Liu et al. | |
| 2011/0107743 | A1 | 5/2011 | Ranganathan | |
| 2012/0216513 | A1 | 8/2012 | Greber et al. | |

FOREIGN PATENT DOCUMENTS

| | | |
|---|---|---|
| DE | 10312212 | 9/2006 |
| DE | 102005061145 | 6/2007 |
| DE | 202007010324 | 11/2008 |
| DE | 102007051510 | 4/2009 |
| DE | 102007052262 | 5/2009 |
| DE | 202008001022 | 6/2009 |
| DE | 102008008563 | 8/2009 |
| DE | 102008008564 | 8/2009 |
| DE | 102008040476 | 4/2013 |
| DE | 10241697 | 5/2016 |
| EP | 0268026 | 8/1993 |
| EP | 1314864 | 1/2007 |
| EP | 2221459 | 8/2010 |
| EP | 2282026 | 2/2011 |
| EP | 2295755 | 3/2011 |
| EP | 2405109 | 1/2012 |
| EP | 2492465 | 8/2012 |
| EP | 2465602 | 11/2013 |
| EP | 2687286 | 1/2014 |
| EP | 2295756 | 3/2014 |
| EP | 2860369 | 4/2015 |
| EP | 2860370 | 4/2015 |
| EP | 2325452 | 5/2015 |
| EP | 2884069 | 6/2015 |
| EP | 2980379 | 2/2016 |
| FR | 2897646 | 8/2008 |
| FR | 2965011 | 3/2012 |
| FR | 2977632 | 1/2013 |
| JP | H2223624 | 2/1989 |
| JP | H0296212 | 4/1990 |
| JP | 2013002367 | 1/2013 |
| KR | 20110049152 A | 5/2011 |
| SE | 531199 | 1/2009 |
| WO | 9701387 | 1/1997 |
| WO | 2008027146 | 3/2008 |
| WO | 2008034981 | 3/2008 |
| WO | 2009068136 | 6/2009 |
| WO | 2010078052 | 7/2010 |
| WO | 2011056676 | 5/2011 |
| WO | 2011106487 | 9/2011 |
| WO | 2011110885 | 9/2011 |
| WO | 2011139953 | 11/2011 |
| WO | 2011163395 | 12/2011 |
| WO | 2012013562 | 2/2012 |
| WO | 2012044233 | 4/2012 |
| WO | 2012047159 | 4/2012 |
| WO | 2012050509 | 4/2012 |
| WO | 2012052560 | 4/2012 |
| WO | 2012053960 | 4/2012 |
| WO | 2012054437 | 4/2012 |
| WO | 2012096971 | 7/2012 |
| WO | 2012120000 | 9/2012 |
| WO | 2013010700 | 1/2013 |
| WO | 2013035112 | 3/2013 |
| WO | 2013036406 | 3/2013 |
| WO | 2013048309 | 4/2013 |
| WO | 2013099312 | 7/2013 |
| WO | 2013099313 | 7/2013 |
| WO | 2013099314 | 7/2013 |
| WO | 2013112154 | 8/2013 |
| WO | 2013178321 | 12/2013 |
| WO | 2014017310 | 1/2014 |
| WO | 2014047091 | 3/2014 |
| WO | 2014051617 | 4/2014 |
| WO | 2014051617 A1 | 4/2014 |
| WO | 2014077023 | 5/2014 |
| WO | 2014112063 | 7/2014 |
| WO | 2014112067 | 7/2014 |
| WO | 2014112072 | 7/2014 |
| WO | 2014112073 | 7/2014 |
| WO | 2014115461 | 7/2014 |
| WO | 2014182832 | 11/2014 |
| WO | 2015018971 | 2/2015 |
| WO | 2015020820 | 2/2015 |
| WO | 2015074926 | 5/2015 |
| WO | 2015076765 | 5/2015 |
| WO | 2015130640 | 9/2015 |
| WO | 2015151282 | 10/2015 |
| WO | 2015187128 | 12/2015 |
| WO | 2016013319 | 1/2016 |

(56) References Cited

OTHER PUBLICATIONS

International Search Report for PCT International Application Serial No. PCT/US2016/058114, 16FECT013 PCT II, 9 pages.

Jean et al., New Concepts for the Urea Injection Area in SCR Exhaust Systems for Passenger Cars, Aachen Congress, p. 1373-2010, 2010, 18 pages.

Rusch et al., Urea SCR Interaction of Spray Generation and Exhaust System, 3rd International CTI Forum SCR-System, Bonn, Apr. 2008, 30 pages.

\* cited by examiner

MIXER WITH INTEGRATED DOSER CONE

CROSS-REFERENCE TO RELATED APPLICATION

This continuation-in-part application claims priority to U.S. patent application Ser. No. 14/737,546, filed Jun. 12, 2015, which claims priority to U.S. Provisional Patent Application No. 62/155,025, filed Apr. 30, 2015.

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF) or a reducing agent, such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

In one known configuration, the mixer includes an outer housing with an opening that receives the doser. A cone is aligned with this opening to provide a widening spray area into the internal cavity of the outer housing. The widening spray area facilitates a more thorough distribution of spray droplets over a larger area as the spray enters the exhaust gas stream.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixer and onto the tip of the doser, which creates deposit initiation sites. In configurations that utilize a cone, deposit initiation sites have been found on the wall of the cone. The deposits in these sites build up over time and can adversely affect system operation. For example, there may be a lower ammonia uniformity index, there may be an increased pressure drop across the mixer, or they may be a peak of ammonia emissions during active diesel particulate filter (DPF) regeneration.

SUMMARY OF THE INVENTION

In one exemplary embodiment, a mixer for a vehicle exhaust system includes a mixer housing defining a mixer central axis and having an inlet at an upstream end and an outlet at a downstream end. An upstream baffle is in the housing at the upstream end and includes at least one inlet opening configured to receive engine exhaust gas. A downstream baffle is in the mixer housing at the downstream end such that the downstream baffle is axially spaced from the upstream baffle. The downstream baffle includes at least one outlet opening. A housing opening is formed within the mixer housing at a location between the upstream and downstream baffles, and which is configured to receive a doser. A cone has a cone outlet opening aligned with the housing opening, and an extension portion extends outwardly from a wide end of the cone to provide a wall that surrounds the cone outlet opening.

In a further embodiment of the above, the doser is configured to spray a reducing agent into an area between the upstream baffle and the downstream baffle such that a mixture of reducing agent and exhaust gas exits the mixer housing, and wherein the mixture moves through a rotational flow path that is at least 360 degrees before exiting the mixer housing.

In a further embodiment of any of the above, the upstream baffle includes a first portion, a second portion offset from the first portion in a direction along the mixer central axis, and a third portion that transitions from the first portion to the second portion, and wherein the at least one inlet opening comprises at least one primary inlet opening and one or more secondary inlet openings; and the downstream baffle includes a first portion, a second portion offset from the first portion in a direction along the mixer central axis, and a third portion that transitions from the first portion to the second portion, and wherein the at least one outlet opening comprises at least one primary outlet opening and one or more secondary outlet openings.

In a further embodiment of any of the above, an extension plate is positioned within the mixer housing downstream of the downstream baffle, the extension plate including at least one plate main outlet opening such that from an upstream location between the upstream baffle and downstream baffle at the doser axis to a downstream location at a center axis of the plate main outlet opening, the mixture goes through at least 390 degrees rotation.

In a further embodiment of any of the above, at least one of the secondary inlet and outlet openings includes a lip, and wherein the lip extends away from a respective one of the upstream baffle and the downstream baffle to define a lip height that is at least three times a material thickness of the respective one of the upstream baffle and the downstream baffle.

In a further embodiment of any of the above, the first portion of the upstream baffle comprises a first flat surface, the second portion comprises a second flat surface that is smaller than the first flat surface, and the third portion comprises a helical surface that transitions from the first flat surface to the second flat surface, and wherein the upstream baffle includes a vertical wall portion extending between the first and second flat surface which includes the at least one primary inlet opening.

In a further embodiment of any of the above, the at least one primary inlet opening comprises at least three inlet openings formed in the vertical wall portion.

In a further embodiment of any of the above, wherein the first flat surface comprises at least half of the upstream baffle.

In a further embodiment of any of the above, the one or more secondary inlet openings are only formed within the first flat surface of the upstream baffle with a remaining portion of the upstream baffle being free from secondary inlet openings.

In a further embodiment of any of the above, the first portion of the downstream baffle comprises a first flat surface, the second portion comprises a second flat surface offset from the first flat surface, and the third portion comprises a helical surface that transitions from the first flat surface to the second flat surface, and wherein the primary outlet opening comprises an open area formed within a vertical offset between the first and second flat surfaces of the downstream baffle.

In a further embodiment of any of the above, at least half of the downstream baffle has a solid surface free from secondary outlet openings, and wherein the solid surface of the downstream baffle is aligned with the doser axis such that a spray zone defined by the doser extends over the solid surface without encountering any secondary outlet openings.

In a further embodiment of any of the above, the cone has a narrow end with an inlet opening and a tapered body portion extending from the narrow end to the wide end that provides the outlet opening, and where the extension portion surrounds the outlet opening and extends along an inner circumference of the mixer housing.

In a further embodiment of any of the above, the cone has a narrow end with an inlet opening and a tapered body portion extending from the narrow end to the wide end that provides the outlet opening, and including an intermediate plate positioned between the upstream and downstream baffles, the intermediate plate being attached to the extension portion, and wherein the intermediate plate comprises a wedge-shape having an apex near a mixer central axis and widening radially outward in a direction toward the outer housing, and wherein the intermediate plate comprises a flat portion defined by a first edge extending radially outward from the apex, a second edge extending radially outward from the apex and circumferentially spaced from the first edge, and an outer peripheral edge connecting the first and second edges to define the wedge-shape, and wherein the extension portion is connected to the intermediate plate along at least a portion of the outer peripheral edge, and wherein the intermediate plate includes a flange portion extending outwardly from the outer peripheral edge, and wherein an edge of the flange portion is attached to the extension portion.

These and other features of this application will be best understood from the following specification and drawings, the following of which is a brief description.

BRIEF DESCRIPTION OF THE DRAWINGS

FIG. 5 is a perspective view of the sub-assembly of FIG. 4A included within the mixer.

DETAILED DESCRIPTION

Figure 1:
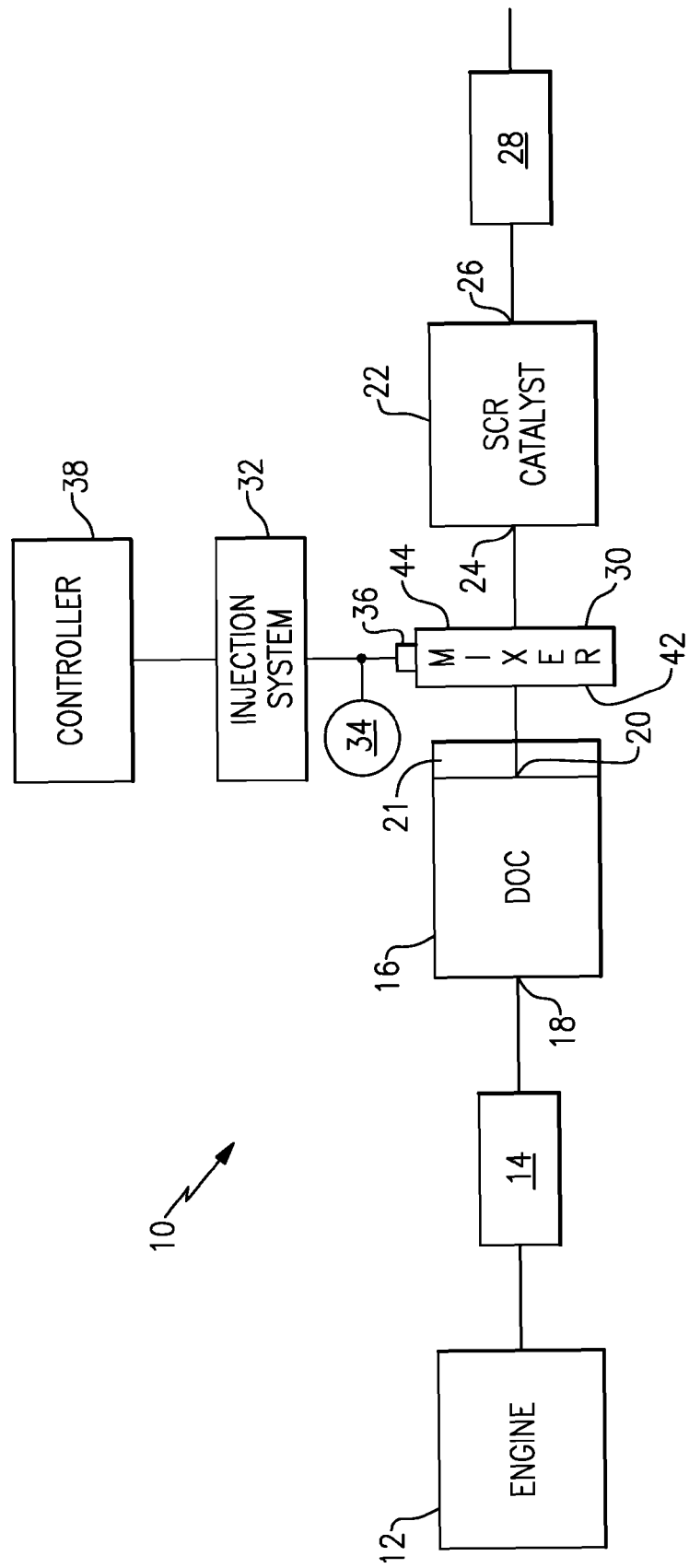
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust components 14 direct exhaust gases into a diesel oxidation catalyst (DOC) 16 having an inlet 18 and an outlet 20. Downstream of the DOC 16 is an optional component 21 that may be a diesel particulate filter (DPF), which is used to remove contaminants from the exhaust gas as known. In one example, the component 21 may be the DPF and a subsequent portion of exhaust pipe with an optional elbow type connection. In another example, the component 21 may be a portion of exhaust pipe with an optional elbow type connection. Downstream of the DOC 16 and optional component 21 is a selective catalytic reduction (SCR) catalyst 22 having an inlet 24 and an outlet 26. The inlet 24 may be located away from the mixer outlet face 44. In this example an exhaust system pipe will drive the exhaust flow to the catalyst 22. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or component 21 and upstream of the inlet 24 of the SCR catalyst 22. The upstream catalyst and downstream catalyst can be in-line, in parallel or any other configuration. The mixer 30 (as shown in the in-line configuration) is used to generate a swirling or rotary motion of the exhaust gas. An injection system 32 is used to inject a gaseous or liquid reducing agent, such as a solution of urea and water for example, into the exhaust gas stream upstream from the SCR catalyst 22 such that the mixer 30 can mix the injected substance and exhaust gas thoroughly together. In an example, the injection system 32 includes a fluid supply 34, a doser 36, and a controller 38 that controls injection of the reducing agent as known. Optionally, component 36 can be a pipe of introduction of gaseous reducing agent. Operation of the controller 38 to control injection of the reducing agent is known and will not be discussed in further detail.

The mixer 30 is shown in greater detail in FIGS. 2-9. As shown in FIG. 2A, the mixer 30 comprises a mixer outer housing having an inlet end 42 configured to receive the engine exhaust gases and an outlet end 44 to direct a mixture of swirling engine exhaust gas and products transformed from urea to the SCR catalyst 22. Further, the mixer body includes an upstream baffle 50 (FIGS. 2A-2B) and a downstream baffle 52 (FIG. 3) that are surrounded by an outer peripheral wall 54. The upstream baffle 50 is configured to initiate swirling of the exhaust gas flow. The mixer 30 also includes an inner peripheral surface 56 (FIG. 5) that faces inwardly toward a mixer center axis A.

The upstream baffle 50 at the inlet 42 may include a large inlet opening 60 that can receives the majority of the exhaust gas (for example, the large inlet opening 60 receives 60% of the exhaust mass flow rate), and which is configured to initiate the swirling motion. The upstream baffle 50 also includes a plurality of perforations, slots, or additional inlet openings 62 that ensure optimal homogenization of exhaust gases and reduces back pressure. The upstream baffle 50 and the plurality of inlet openings 60, 62 cooperate to initiate a swirling motion to the exhaust gas as the exhaust gas enters the inlet end 42 of the mixer 30.

The downstream baffle 52 includes a large outlet opening 64 (FIG. 9) through which the majority of the exhaust gas exits. The downstream baffle 52 also includes a plurality of additional outlet openings 66 surrounded by lips 68 through which the exhaust gas exits. The lips 68 keep the urea inside the mixer 30 in order to increase DEF transformation and improve mixing performance. The lips 68 also generate additional turbulence to further improve mixing performance. The downstream baffle 52 comprises a helical portion 70. An axis of the helix is the center axis of the mixer represented by A (FIG. 2) with a rim 72 formed about an outer perimeter of the helical portion 70. The rim 72 extends in an upstream direction.

The large outlet opening 64 comprises primary outlet opening and is larger than the other outlet openings 66. The helical portion 70 includes the additional outlet openings 66. The helical portion 70 is formed by an upstream end portion 74 and a downstream end portion 78. Portions 74 and 78 include flat surface portions perpendicular to the mixer axis A (FIG. 2A) with the helical portions extending therebetween. A wall 80 extends between the flat surface of the downstream end portion 78 and the flat surface of the upstream end portion 74, and the primary outlet opening 64 is formed within the wall 80.

Figure 2A:
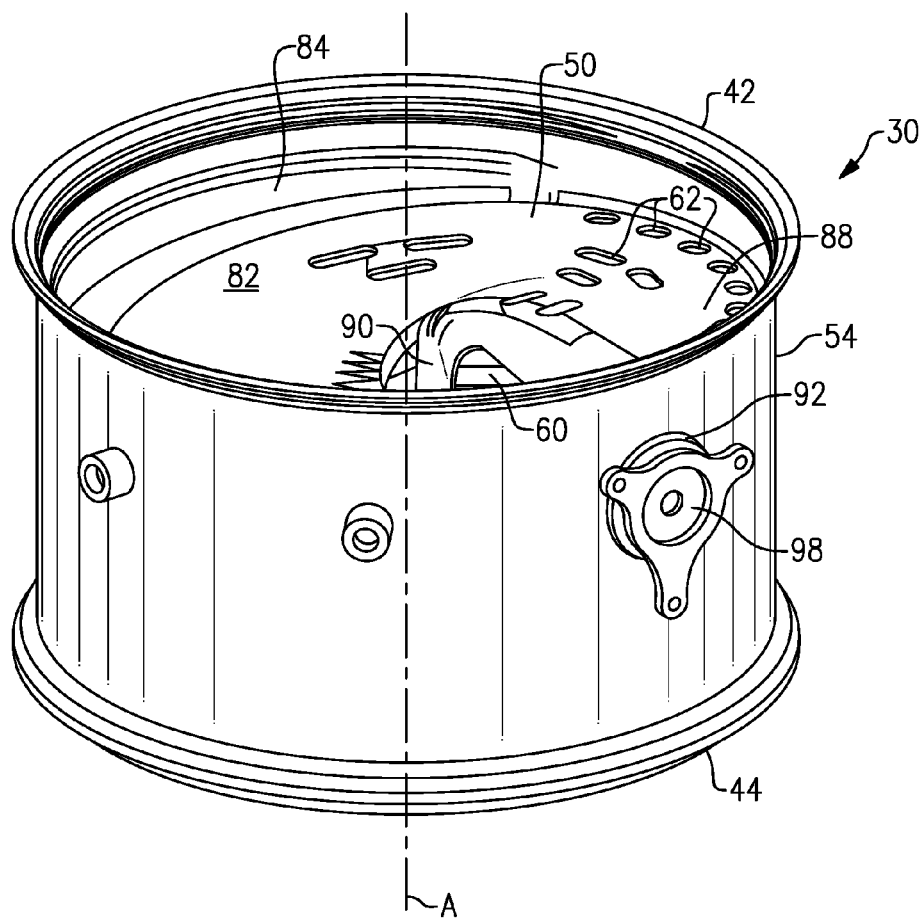
FIG. 2A is a perspective view of an upstream end of a mixer according to the subject invention.
Figure 2B:
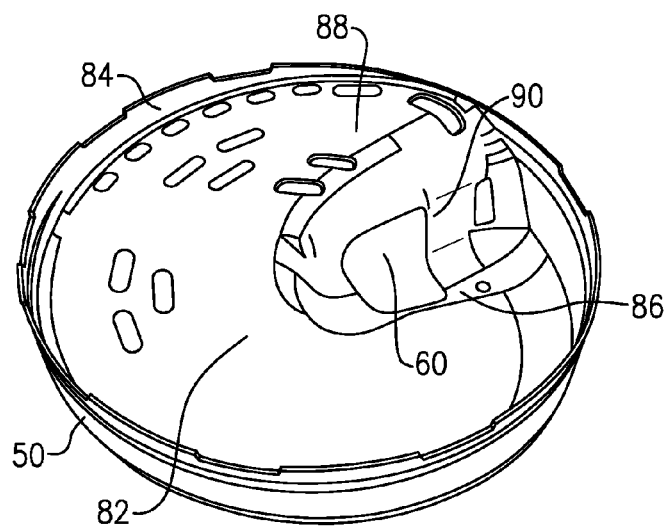
FIG. 2B is a perspective of an upstream baffle from FIG. 2A.
Figure 3:
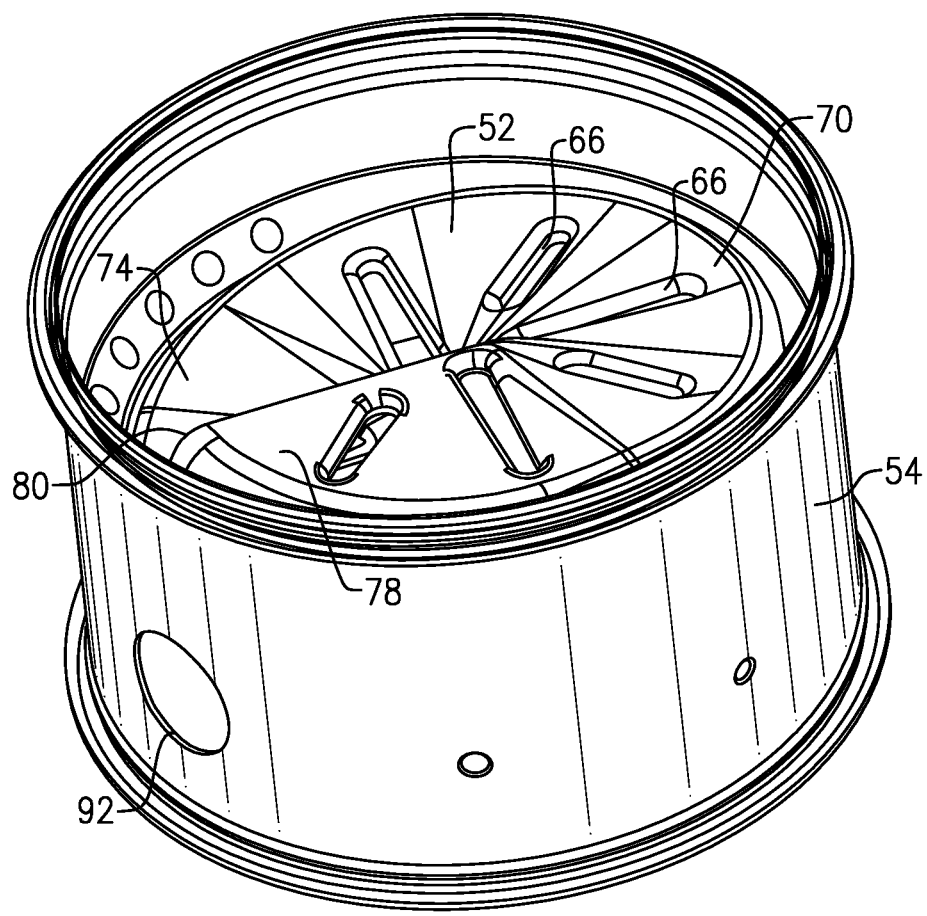
FIG. 3 is a perspective view of a downstream end of the mixer according to the subject invention.

Similarly, as shown in FIG. 2B, the upstream baffle 50 comprises a helical portion 82 with a rim 84 formed about an outer perimeter of the helical portion 82. The large inlet opening 60 comprises a primary inlet opening and may be larger than the other inlet openings 62. The helical portion 82 includes additional inlet openings 62 and has an upstream end portion 88 and a downstream end portion 86. A wall 90 extends from the upstream portion 88 to the downstream portion 86 and the primary inlet opening 60 is formed within the wall 90.

Figure 4A:
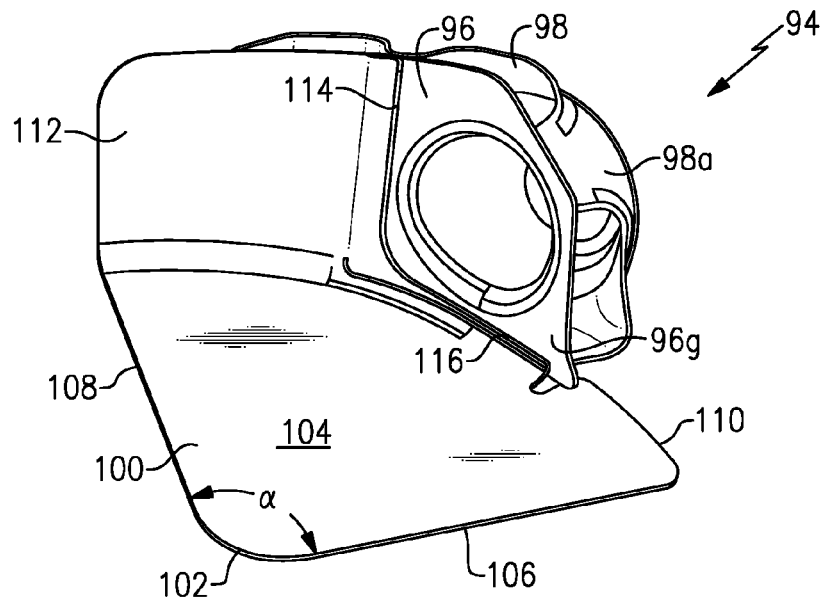
FIG. 4A is a perspective front view of a mixer sub-assembly including a cone, manifold, and intermediate plate.
Figure 4B:
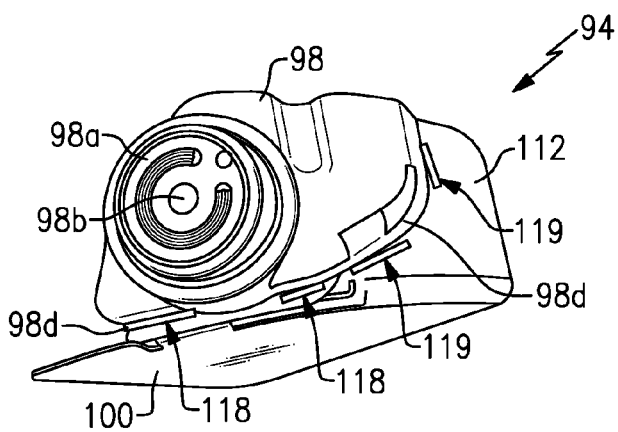
FIG. 4B is a perspective rear view of the sub-assembly of FIG. 4A.
Figure 4C:
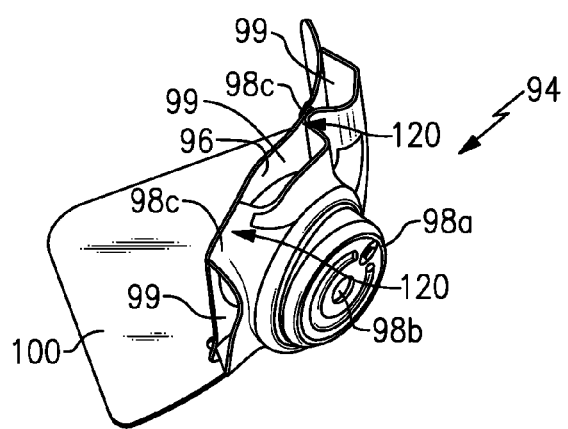
FIG. 4C is a perspective top view of the sub-assembly of FIG. 4A.

The outer peripheral wall 54 includes an opening 92 formed at a location between the upstream 50 and downstream 52 baffles. The opening 92 is configured to receive the doser 36. FIGS. 4A-4C show a sub-assembly 94 that is aligned with the opening 92 to facilitate mounting of the doser 36 to the mixer 30 such that spray is introduced into the exhaust gas stream in the desired orientation. The sub-assembly 94 includes a cone 96, a manifold 98, and an intermediate plate 100. The cone 96 has a narrow end 96a with an inlet opening 96b and a wide end 96c with an outlet opening 96d. A tapered body portion 96e extends from the narrow end 96a to the wide end 96c. An extension transition portion 96f extends from the wide end 96c of the cone 96 to provide a wall 96g that surrounds the outlet opening 96d. This extension transition portion 96f provides a smooth transition (as indicated at 96h in FIG. 6) between the tapered portion of the cone 96 and the wall 96g, which reduces deposit build-ups in this area.

As best shown in FIGS. 4B-4C, the manifold 98 includes an interface portion 98a with a doser opening 98b that is aligned with the opening 92 in the outer peripheral wall 54. Optionally one or more attachment arms 98c extend from the interface portion 98a in a direction toward the wall 96g of the cone 96. Optionally one or more flanges 98d extend from the interface portion 98a towards the wall 96g or the flange 112. Arms 98c and flanges 98d are disposed in a certain way to create one or more chambers 99. The exhaust flow goes through the chamber 99 and is directed to the inlet opening 96b. The inlet opening 96b of the cone 96 is aligned with the doser opening 98b such that the narrow end 96a of the cone 96 fits within the interface portion 98a of the manifold 98.

The intermediate plate 100 is attached to the manifold 98 and the cone 96 to form the sub-assembly 94. The intermediate plate 100 has an apex 102 near the mixer central axis A and which widens radially outward in a direction toward the outer peripheral wall 54. The intermediate plate 100 comprises a flat portion 104 defined by a first edge 106 extending radially outward from the apex 102, a second edge 108 extending radially outward from the apex 102 and circumferentially spaced from the first edge 106, and an outer peripheral edge 110 connecting the first 106 and second 108 edges to define a wedge-shape. The first edge 106 comprises an inlet side of the intermediate plate 100 and the second edge 108 comprises the outlet side of the intermediate plate 100. The angle defined by edge 106 and edge 108 can vary from 70 deg to 270 deg. The flat portion 104 can have an adjacent helical portion at the outlet side, which is the edge 108.

In one example, the intermediate plate 100 includes a flange portion 112 that extends in an upstream direction from the outer peripheral edge 110. The flange portion 112 does not extend along the entire outer peripheral edge 110.

As shown in FIG. 4A, the wall 96g of the cone 96 can be attached to one edge of the flange portion 112 (as indicated at 114) and can be also attached along a portion of the outer peripheral edge 110 (as indicated at 116). As shown in FIGS. 4B-4C, the flange 98d of the manifold 98 is attached with weld(s) 118 to the wall portion 96g of the cone 96 and weld(s) 119 to the flange portion 112 of the intermediate plate 100. As shown in FIG. 4C, the arm portions 98c of the manifold 98 are attached to the wall portion 96g of the cone 96 with welds 120 to form the sub-assembly 94.

The sub-assembly 94 is then placed within the mixer 30, as shown in FIG. 5, such that the flange portion 112 of the intermediate plate can be welded, or otherwise attached, to the rim 72 of the downstream baffle 52. As shown, the cone 96 and the interface portion 98a of the manifold 98 are nested within the opening 92 in the mixer 30. As shown, the opening defines a doser axis D that optionally does not intersect the mixer central axis A (FIG. 5).

As best shown in FIGS. 4A and 5, the wall portion 96g and the cone body are integrally formed together as a single-piece component. An extension transition portion 96f extends (FIG. 6) from an inner surface 130 of the tapered portion of cone 96 at the wide end 96c to the wall 96g. As discussed above the, the wall 96g provides a smooth transition 96h into the mixer itself (FIG. 6) to reduce the risk of DEF deposit formation. Further, this configuration provides a simpler assembly that reduces manufacturing time and costs, as well as increasing overall robustness of the mixer.

Figure 6:
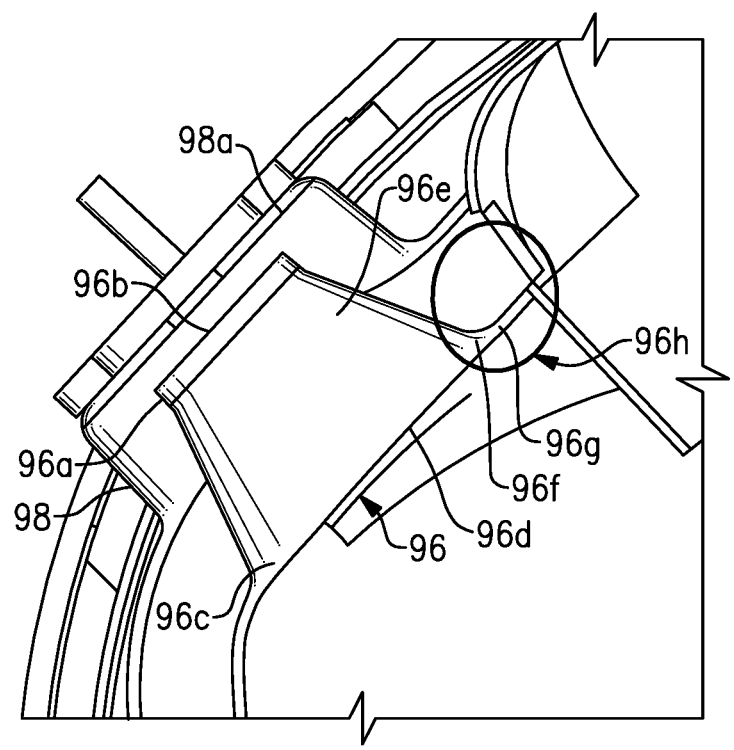
FIG. 6 is a schematic section view of the cone in relation to a mixer inner wall.
Figure 7:
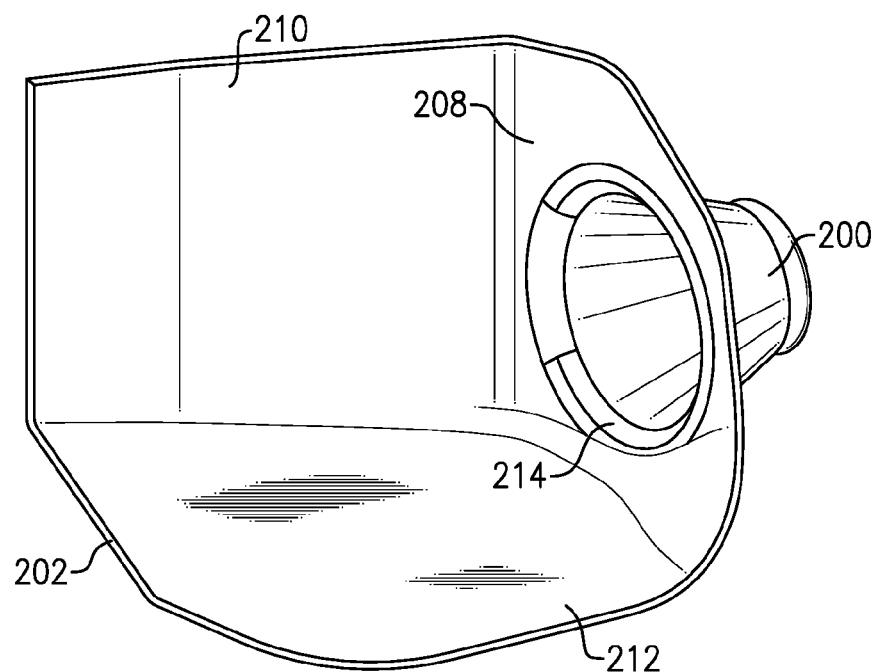
FIG. 7 is a perspective view another example of a cone and extension portion.
Figure 8:
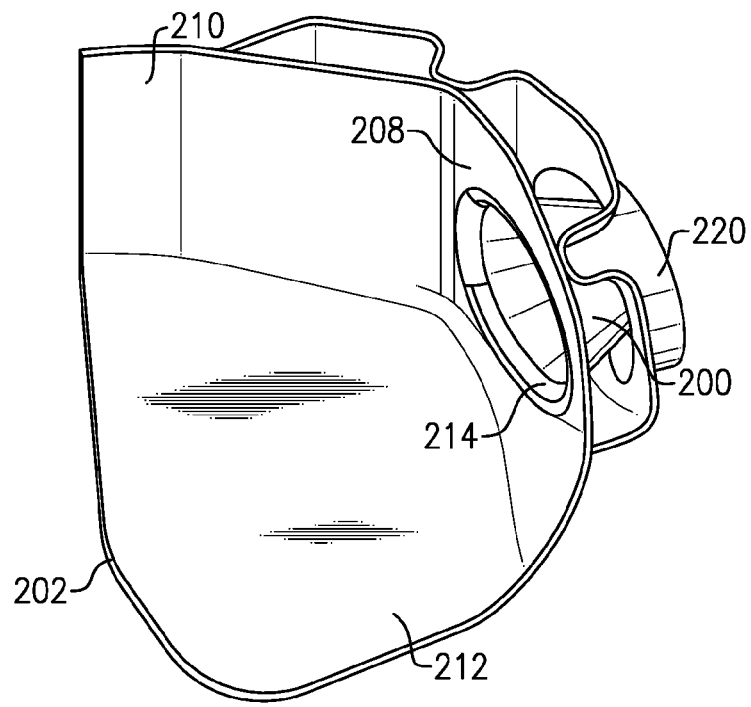
FIG. 8 is a perspective view of the embodiment of FIG. 7 and the manifold.

In the example shown in FIGS. 4-6, the sub-assembly 94 includes the intermediate plate 100 as a separate component that is attached to the cone 96. In another example, embodiment shown in FIGS. 7-9, a cone 200 can be integrally formed with an intermediate plate 202 as a single-piece component. The cone 200 includes an extension portion 214 surrounding an outlet opening that provides a wall 208. This wall 208 then extends integrally into a circumferential wall portion 210 and a base plate portion 212. The wall portion 210 is similar in form to the flange portion 112, and the base plate portion 212 is similar to the wedge-shaped plate portion 104, of the separate intermediate plate shown in FIG. 4A. An extension portion 214 transitions from an inner surface of the cone 200 to the wall 208.

Figure 9:
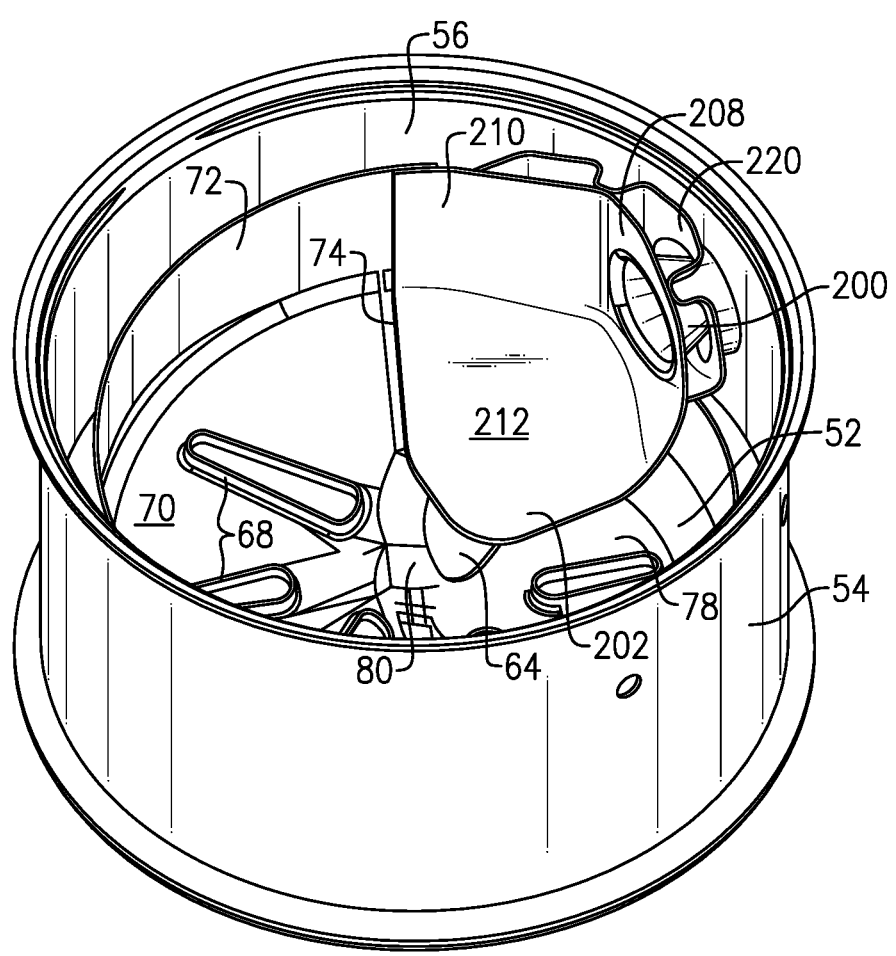
FIG. 9 is a perspective view of the sub-assembly of FIG. 8 included within the mixer.

The cone 200 is attached to a manifold 220 (FIG. 8) that is similar to the manifold 98. This sub-assembly is then installed within the mixer 30 as shown in FIG. 9.

The intermediate plate 100 and plate portion 212 for these example embodiments, are positioned between the upstream 50 and downstream 52 baffles to block direct flow from the primary inlet opening 60 to the primary outlet opening 64. This blockage provides for a rotational flow path that directs exhaust gases exiting the primary inlet opening 60 through a rotation of more than 360 degrees about the mixer central axis A before exiting the primary outlet opening 64. This increased degree of rotation results in more thorough mixing of the reducing agent within the exhaust gas. Also, this more thorough mixing occurs without having to increase the overall axial mixer length according to the axis A direction.

Thus, the subject invention provides a compact mixer 30 that allows at least 360 degrees of flow path in order to increase mixing performance and enhance DEF transformation when a liquid reducing agent is used. Additionally, by providing an integrated doser cone 96, a smooth transition is provided at the interface between the cone outlet and inner mixer wall resulting in reduced deposit formation, which further improves performance. This improved performance is provided without increasing the axial length of the mixer and, further, does not adversely affect back pressure. For example, this 360 to 450 degree rotation flow path is provided within a mixer having an overall length that is 7 to 10 inches long according to the direction defined by axis A.

Figure 10:
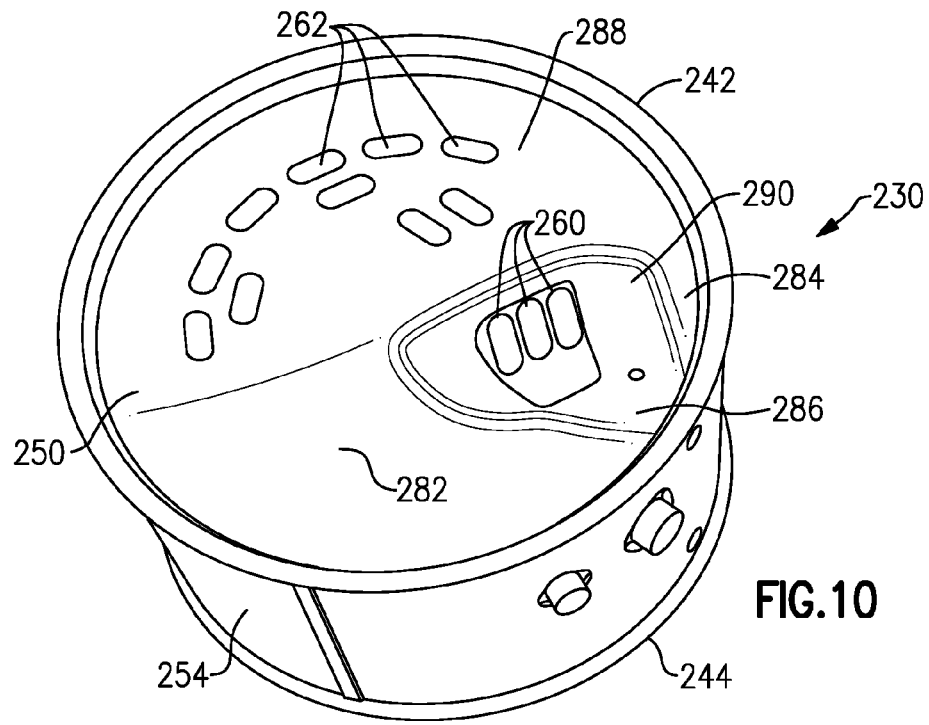
FIG. 10 is a perspective view from an inlet end of another embodiment of a mixer incorporating the subject invention.

Another example of a mixer 230 is shown in FIG. 10. In this example, the mixer 230 comprises a mixer body having an inlet end 242 configured to receive the engine exhaust gases and an outlet end 244 to direct a mixture of swirling engine exhaust gas and products transformed from urea to the SCR catalyst 22. Further, the mixer body includes an upstream baffle 250 (FIG. 10) and a downstream baffle 252 (FIG. 11) that are surrounded by an outer peripheral wall 254 of a ring-shaped structure. The upstream baffle 250 is configured to initiate swirling of the exhaust gas flow. The ring-shaped structure also includes an inner peripheral surface 256.

The upstream baffle 250 has an upstream end portion 288 and a downstream end portion 286 with a helical portion 282 transitioning between the upstream end portion 288 and the downstream end portion 286. An outer rim 284 is formed about an outer perimeter of the upstream baffle 250. The upstream end portion 288 provides a generally large flat area and the downstream end portion 286 comprises a generally smaller flat area that is offset from the flat area of the upstream end portion 288 in a direction along the axis A. The helical portion 282 comprises a surface that transitions between the two offset flat areas to facilitate the swirling motion.

Figure 12A:
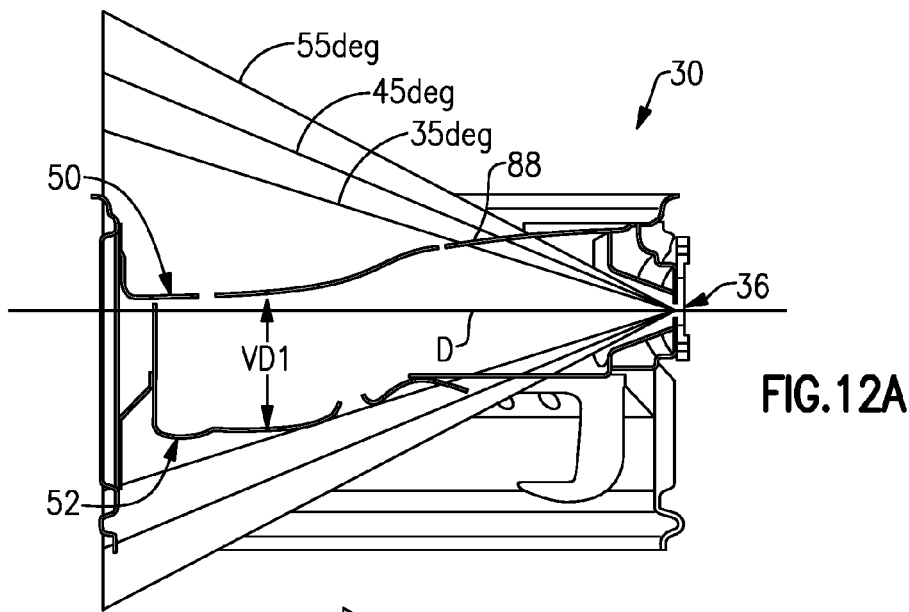
FIG. 12A is a section view of baffles from the mixer shown in FIG. 2A
Figure 12B:
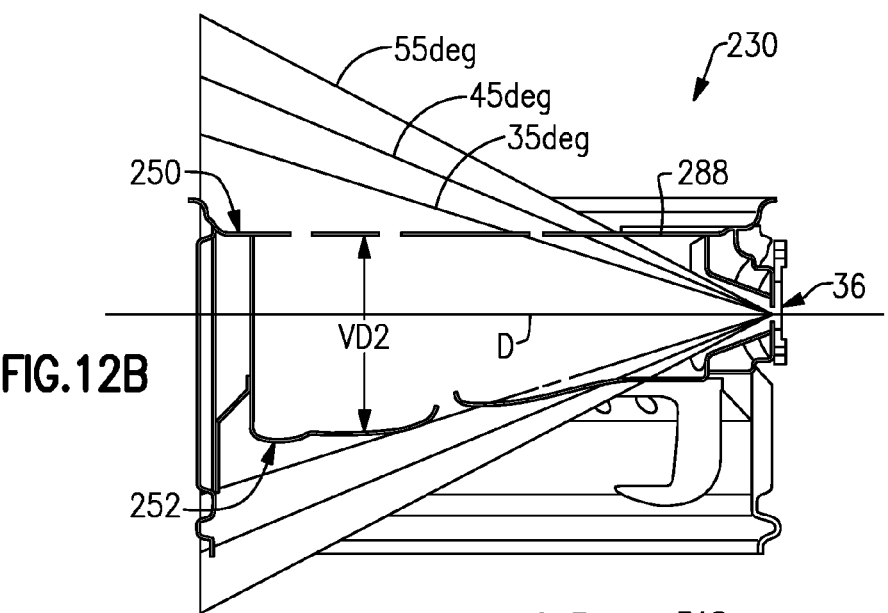
FIG. 12B is a section view of baffles from the mixer shown in FIG. 10.

In the example shown, the flat area of the upstream end portion 288 comprises approximately at least 180 degrees, i.e. about half, of the surface area of the upstream baffle 250, with the helical portion 282 and flat area of the downstream end portion 286 comprising the other 180 degrees, i.e. the other half. FIG. 12A, which corresponds to the embodiment of the upstream baffle 50 shown in FIG. 2A, can be compared to FIG. 12B, which corresponds to the upstream baffle 250 as shown in FIG. 10. In the FIG. 12A embodiment, the flat portion at the upstream end 88 is much smaller than the flat portion for the FIG. 12B embodiment, and the helical portion 82 has a more gradual slope transitioning from the upstream end 88 to the downstream end 86. FIG. 12B, which has the flat area extending over at least 180 degrees, has a helical portion 282 with a much steeper slope than the embodiment of FIG. 12A. This provides for more room in a vertical direction within the mixing area of the mixer 230.

The doser axis D is shown in both FIGS. 12A and 12B. In the FIG. 12A embodiment of the mixer 30 there is a first vertical distance VD1 between the baffles 50, 52. In the FIG. 12B embodiment of the mixer 230 there is a second vertical distance VD2 between the baffles 250, 252 that is greater than the first vertical distance VD1. It is clear from FIGS. 12A and 12B, that the doser axis D, which corresponds generally to a center of a spray zone SZ (FIG. 11), intersects with the upstream baffle 50 of the mixer 30 much sooner than the axis D intersects the upstream baffle 250 of the mixer 230 of FIG. 12B. This improves the amount of penetration of the spray into the mixer 230 as there is more room as compared to the mixer 30 of FIG. 2A.

The upstream baffle 250 also includes a vertical wall 290 that extends from the upstream portion 288 to the downstream portion 286, and which has the primary exhaust gas inlet into the mixer 230. Instead of having one large primary inlet opening 60 in the upstream baffle 50 (FIG. 2A), this configuration includes a plurality of primary inlet openings 260 in the wall 290 of the upstream baffle 250 that receive the majority of the exhaust gas (for example, the primary inlet openings 260 receive 60% of the exhaust mass flow rate. The upstream baffle 250 also includes a plurality of secondary inlet openings 262 that ensure optimal homogenization of exhaust gases and reduces back pressure. The upstream baffle 250 and the inlet openings 260, 262 cooperate to initiate a swirling motion to the exhaust gas as the exhaust gas enters the inlet end 242 of the mixer 230.

As discussed above, the primary inlet openings 260 are formed within the wall 290. The flat area of the upstream end portion 288 includes the additional or secondary inlet openings 262. The secondary inlet openings 262 can be the same size and/or shape as the primary inlet openings, or could be slightly smaller and/or have a different shape. In one example, the baffle portion 282 and the flat area of the downstream end portion 286 do not include any secondary inlet openings, i.e. the secondary inlet openings 262 are only formed in the flat area of the upstream end portion 288.

In the example shown in FIG. 10, there are three (3) primary inlet openings 260 that are used instead of the single primary inlet opening 60. It should be understood that, depending on the application, only two primary inlet openings 260, or more than three primary inlet openings 260 could be used. In one example, the primary inlet openings 260 have an elongated shape, such as a slot shape, with a larger dimension in a first direction to define a slot length, and a smaller dimension in a second direction to define a slot height. In the example shown, the larger dimension extends along the wall 290 in a direction that is from the flat area of the downstream end portion 286 toward the flat area of the upstream end portion 288.

In the example shown, the primary inlet openings 260 are the same size and are spaced apart from each other along the wall 290 in a radial direction. The openings 260 could also be orientated in a different configuration and have different sizes. One benefit have having multiple primary inlet openings 260 as opposed to a single large inlet opening is that the multiple inlet openings 260 help reduce the force of exhaust gas applied against the spray, which reduces the amount of spray that would be forced against the inner peripheral surface 272.

Figure 11:
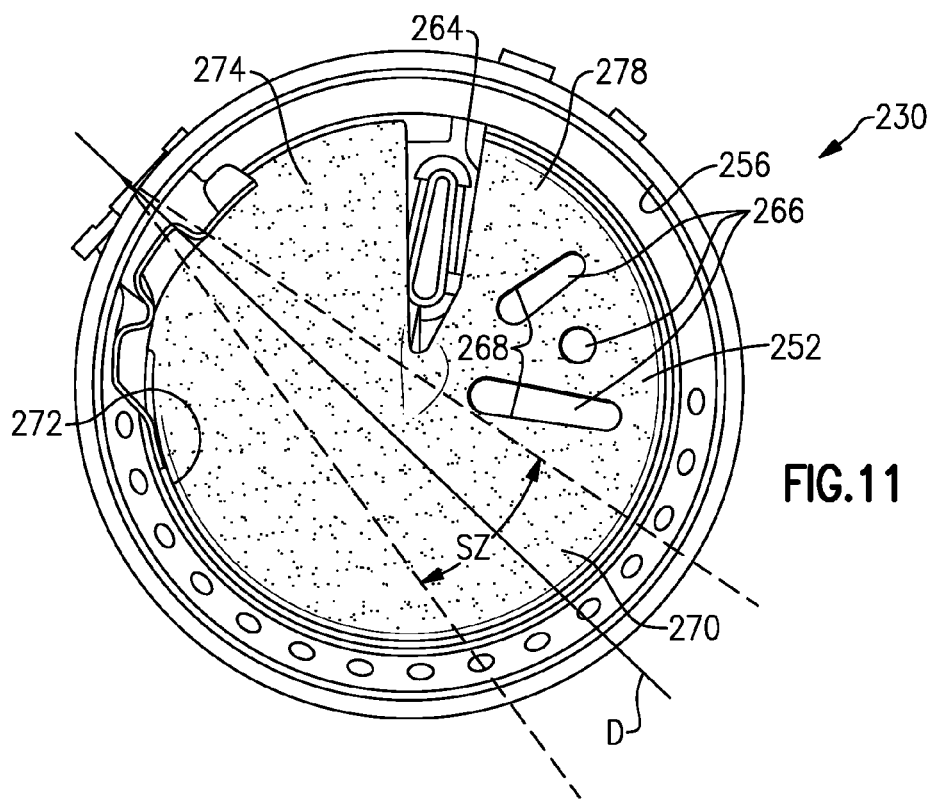
FIG. 11 is a perspective view from an outlet end of the mixer of FIG. 10.

As shown in FIG. 11, the downstream baffle 252 includes a large primary outlet opening 264 through which the majority of the exhaust gas exits. The downstream baffle 252 also includes one or more secondary outlet openings 266 surrounded by lips 268 through which the exhaust gas exits. The lips 268 keep the urea inside the mixer 230 to increase DEF transformation and generate additional turbulence to further improve mixing performance.

The downstream baffle 252 has an upstream end portion 274 and a downstream end portion 278 with a helical portion 270 transitioning between the upstream end portion 274 and the downstream end portion 278. An outer rim 272 is formed about an outer perimeter of the downstream baffle 252. The upstream end portion 274 comprises a flat area that transitions to a flat area at the downstream end portion 278 via the helical portion 270. The two flat areas are offset from each other in a direction along the axis A. The helical portion 270 comprises a surface that transitions between the two offset flat areas to facilitate the swirling motion. The downstream baffle 252 also includes a vertical wall 280 that extends from the upstream portion 274 to the downstream portion 278, and which has the primary outlet opening 264 that is larger than the secondary outlet openings 266. In the example shown, the primary outlet opening 264 comprises an open area formed within the vertical offset between the flat areas of the upstream end portion 274 and downstream end portion 278.

In the example shown, at least 180 degrees, i.e. at least half, of the downstream baffle has a solid surface, i.e. there are no secondary outlet openings 266. This solid surface of the downstream baffle 252 is aligned with the doser axis D such that a spray zone SZ extends over this solid surface as shown in FIG. 11. The secondary openings 266 are thus formed in the downstream end portion 278 adjacent the primary outlet opening 264 and do not overlap the spray zone SZ. In the example shown, there are three secondary openings 266, each having a different size. Further, at least one opening is slot shaped and at least one opening is circular shaped; however, various combinations of shapes and sizes could be used. Further, it should be understood that more or less than three secondary openings could also be used depending upon the application.

Figure 13:
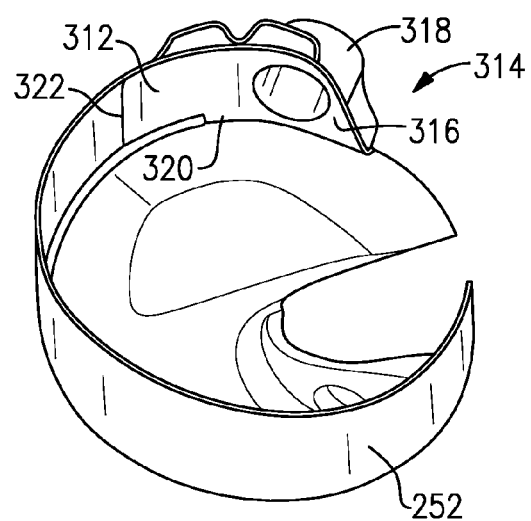
FIG. 13 is a perspective view of a downstream baffle and sub-assembly from the mixer of FIG. 10.

With the mixer 230 as shown in FIGS. 10-11, the flat portion 104 of the intermediate plate 100 (FIG. 4A) is no longer positioned between the baffles 250, 252. Instead, as shown in FIG. 13, a sub-assembly 314 comprising a cone plate 316 and a manifold 318 are used in a manner that is similar to the cone plate 116 and manifold 118 of the mixer 30 as shown in FIGS. 5-6. The cone plate 316 is modified to include a wall portion 312 that is similar to the flange portion 112 of the mixer 30.

The manifold 318 is attached to the cone plate 316 in a manner similar to that described above with regard to the mixer 30. The sub-assembly 314 is then attached to the downstream baffle 252 with a first weld 320 along a circumferential edge of the cone plate 316 and with a second weld 322 along the wall portion 312. It should be understood that while welding interfaces are shown, other attachment methods could also be used, such as brazing for example.

Figure 14:
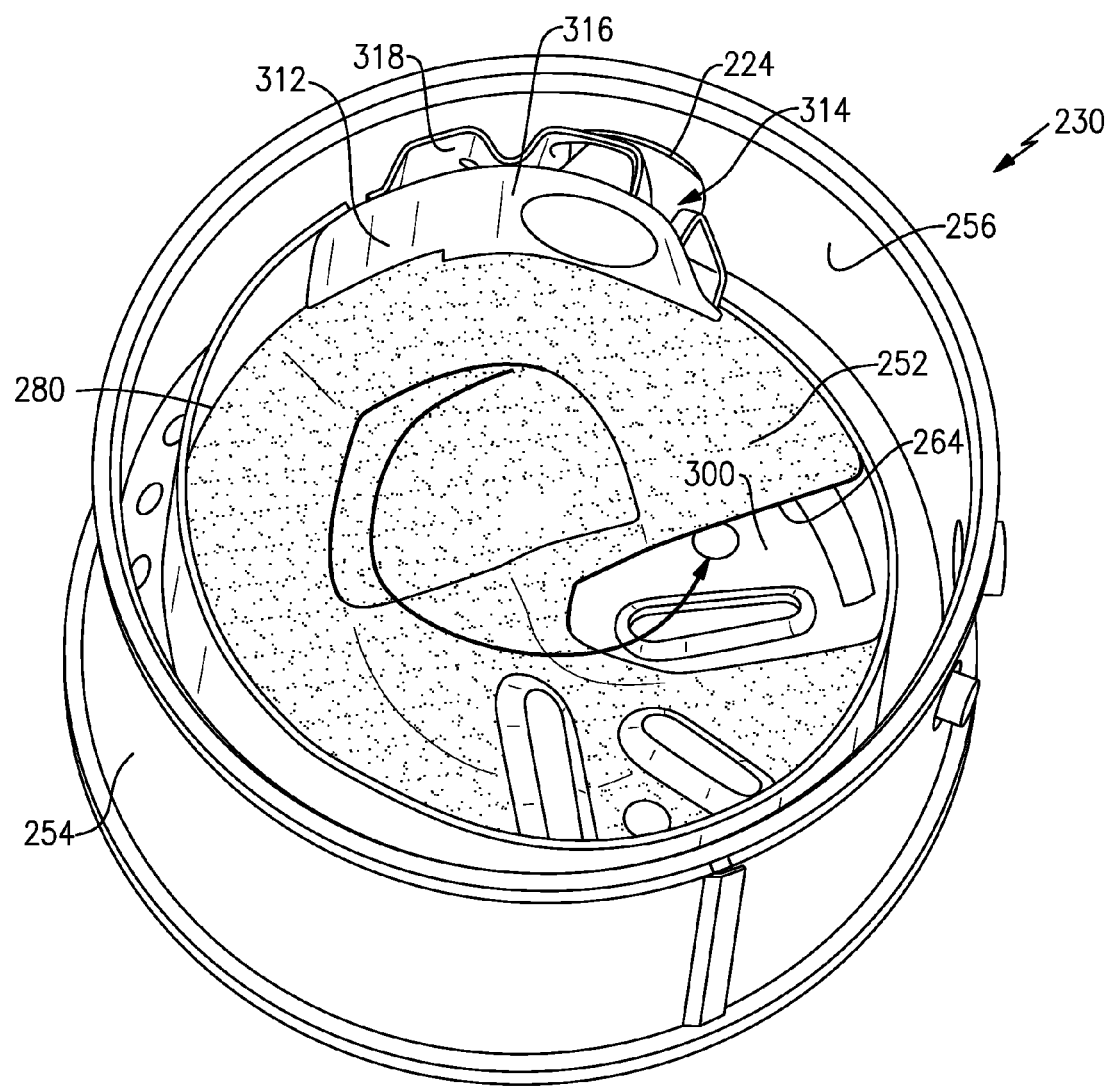
FIG. 14 is a perspective view from the inlet end of the mixer of FIG. 12 but with the upstream baffle being removed.

As shown in FIG. 14, the outer peripheral wall 254 of the mixer 230 includes a doser mount area with a doser opening 224 to receive the doser 36. The upstream and downstream baffles 250, 252 are spaced apart from each other in an axial direction along a length of the mixer 230. The doser opening 224 for the doser 36 is positioned to spray the reducing agent into an area between the upstream baffle 250 and the downstream baffle 252.

When the mixture of spray and exhaust gas exits the primary outlet opening 264 of the downstream baffle 252, the mixture is directed against an extension baffle 300. Thus, the extension baffle 300 is located within the mixer 230 at a location that is downstream of the outlet or downstream baffle 252. The use of extension baffle 300 at this location improves flow distribution and results in better performance for the mixer 230 as compared to the mixer 30.

Figure 15C:
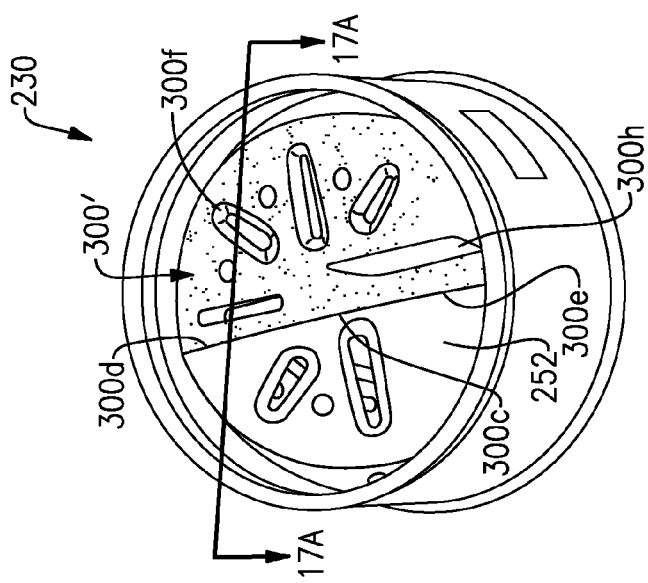
FIG. 15C is a perspective view from the outlet end of the mixer of FIG. 10 with a second embodiment of an extension plate.
Figure 15B:
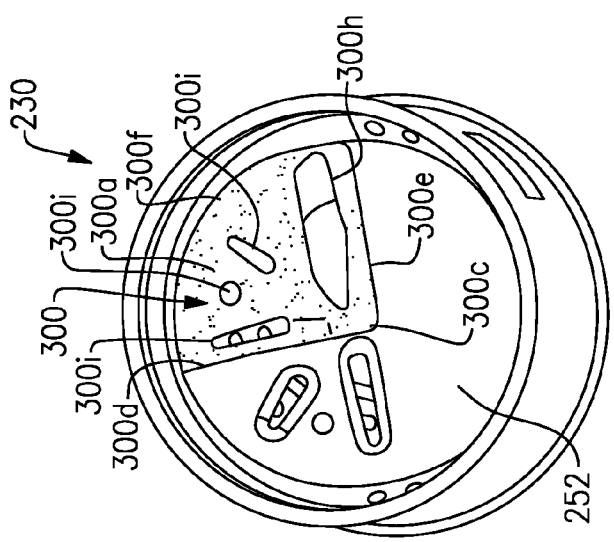
FIG. 15B is a perspective view from the outlet end of the mixer of FIG. 10 with a first embodiment of an extension plate.
Figure 15A:
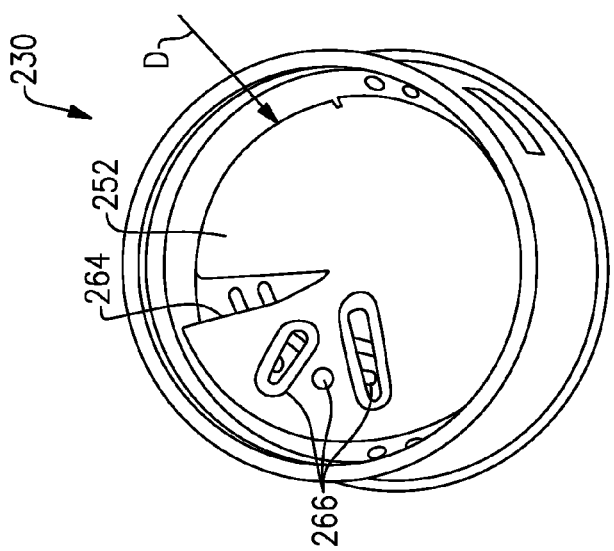
FIG. 15A is a perspective view from the outlet end of the mixer of FIG. 10 without an extension plate.

FIG. 15A shows a view from the outlet end of the mixer 230 without the extension baffle 300. FIG. 15B shows a first embodiment of the extension baffle 300 where the baffle 300 is configured to overlap approximately 90 degrees of the downstream baffle 252. FIG. 15C shows a second embodiment of the extension baffle 300' where the baffle 300' is configured to overlap approximately 180 degrees of the downstream baffle. In each embodiment, the extension baffle 300, 300' includes a generally flat base 300a with circumferential wall portion 300b (FIGS. 18C-D) extending in an upstream direction from an outer peripheral edge of the base 300a.

The flat base 300a comprises a wedge shape that has an apex or center 300c near the mixer central axis A and which widens radially outward in a direction toward the outer peripheral wall 254. The flat base 300a is defined by a first edge 300d extending radially outward from the apex 300c, a second edge 300e extending radially outward from the apex 300c and circumferentially spaced from the first edge 300d, and an outer peripheral edge 300f connecting the first 300d and second 300e edges. The first edge 300d comprises an inlet side or upstream side of the extension baffle 300 and the second edge 300e comprises an outlet side or downstream side of the extension baffle 300. In the example shown, the angle defined by the edges 300d, 300e is approximately 90 degrees; however the angle could be increased or decreased as needed dependent upon the application.

As discussed above, the circumferential wall portion 300b (FIG. 18C-D) extends in the upstream direction from the outer peripheral edge 300f. A radial wall portion 300g (FIG. 18C-D) extends in the upstream direction from the second edge 300e of the flat base 300a. The radial wall portion 300g includes a large primary outlet opening 300h through which a majority of the mixture of exhaust gas and reducing agent exits the mixer 230. The base 300a includes one or more secondary outlet openings 300i which are smaller in size than the primary outlet opening 300h. The secondary outlet openings 300i can be circular or slot shaped, or any combination thereof. Other shapes and different size configurations could also be used. Further, while two slot shaped openings and one circular shaped opening are shown in FIG. 15B, fewer or more openings in any shape or size combination, could also be used dependent upon the application.

The extension baffle 300' of FIG. 15C is similar to that of the baffle 300 of FIG. 15B, but the angle defined by the edges 300d, 300e has been increased to approximately 180 degrees. It should be understood that the angle could be modified to be anywhere between 90 and 180 degrees and could also be increased above 180 degrees or decreased below 90 degrees as needed dependent upon the application.

Figure 16A:
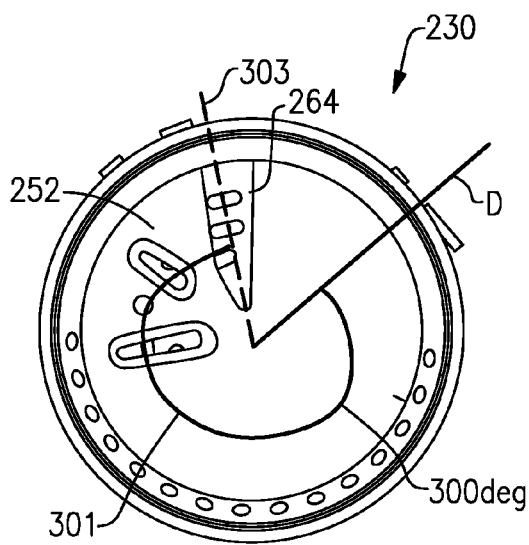
FIG. 16A is an end view of the mixer of FIG. 15A showing a rotational flow path for the mixer of FIG. 15A.

FIG. 16A shows the view from the mixer outlet with the primary outlet opening 264 of the downstream baffle 252 being shown in relation to the doser axis D. As indicated by the arrow 301, from an upstream location at the doser axis D to a downstream location at a center axis 303 of the outlet opening 264, there is less than 360 degrees rotation (approximately 300 degrees of rotation is shown in FIG. 16A). The embodiments of FIGS. 16B and 16C provide for significantly more rotation prior to the mixture exiting the mixer 230.

Figure 16B:
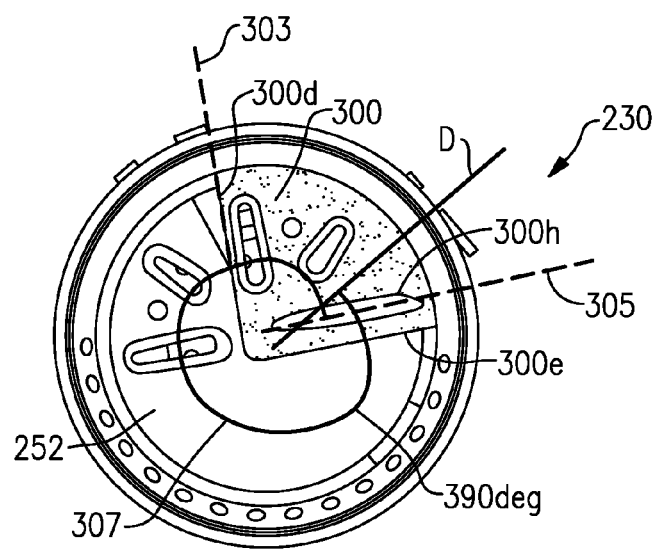
FIG. 16B is an end view of the mixer of FIG. 15B showing a rotational flow path for the mixer of FIG. 15B.
Figure 16C:
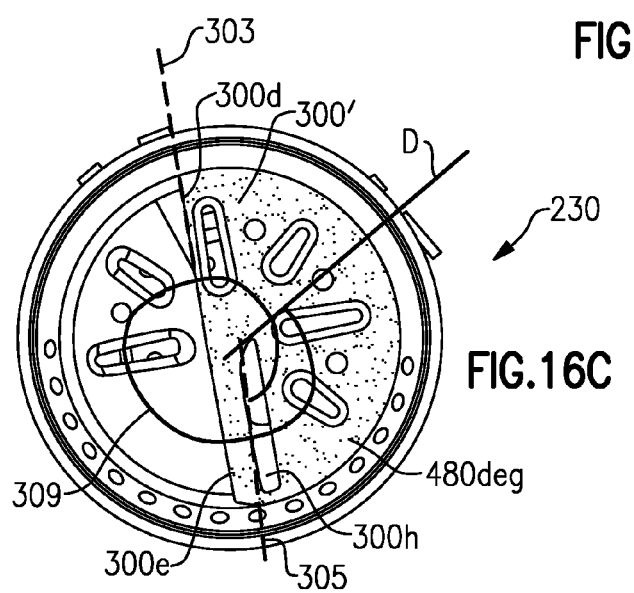
FIG. 16C is an end view of the mixer of FIG. 15C showing a rotational flow path for the mixer of FIG. 15C.

FIG. 16B shows a relationship between an outlet from the mixer 230 and the doser axis D for the extension baffle 300 configuration of FIG. 15B. The upstream or first edge 300d of the flat base 300a is generally aligned along the center axis 303 of the primary outlet opening 264 of the downstream baffle 252. The primary outlet opening 300h of the extension baffle 300 defines a center axis 305. As indicated by the arrow 307, from an upstream location at the doser axis D to a downstream location at the center axis 305 of the outlet opening 300h of the extension baffle 300, there is approximately 390 degrees rotation, which is a significant improvement over the amount of rotation shown in FIG. 16A. FIG. 16C provides for even more rotation as indicated by the arrow 309, where from an upstream location at the doser axis D to a downstream location at the center axis 305 of the outlet opening 300h of the extension baffle 300', there is approximately 480 degrees rotation.

Figure 17A:
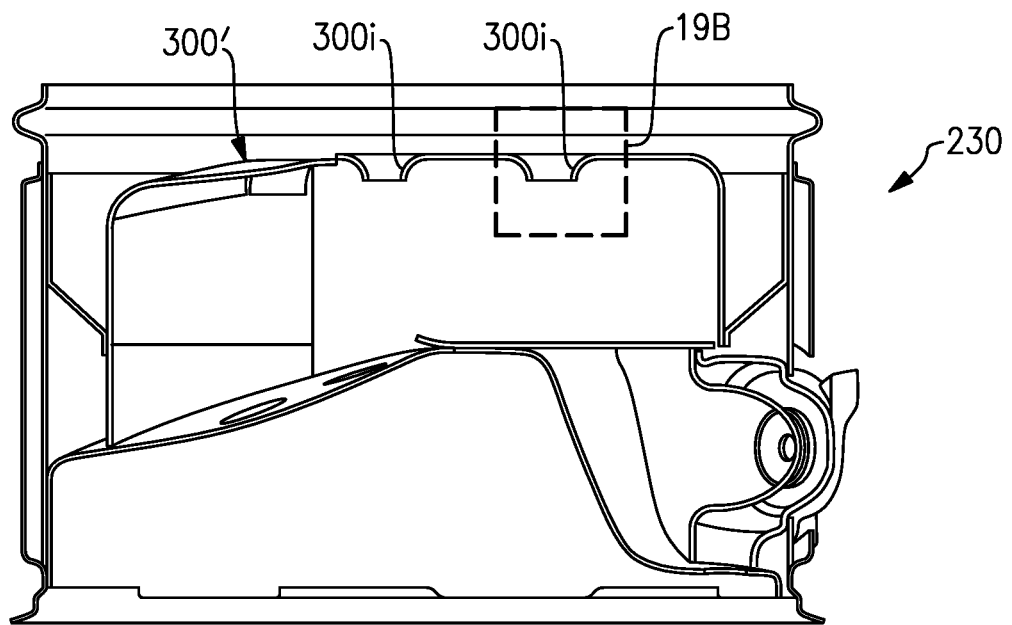
FIG. 17A is a section view taken along the line 17A-17A as indicated in FIG. 15C.
Figure 17B:
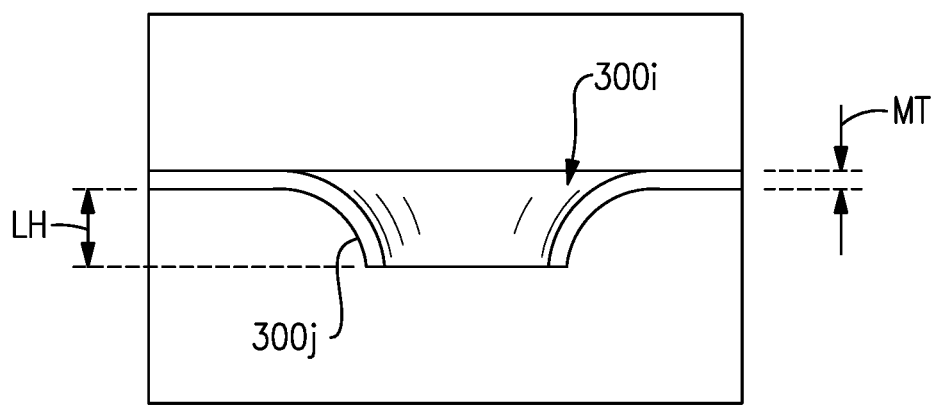
FIG. 17B is a magnified view of the area identified in FIG. 17A.

FIG. 17A is a section view taken as indicated by line 17A in FIG. 15C. This section view is taken through the secondary openings 300i in the extension baffle 300' which are each surrounded by a lip 300j. The lips 300j completely surround each opening 300i and extend in an upstream direction. As shown in the magnified view of FIG. 17B, each lip 300j has a lip height LH that extends outwardly from the base 300a to a distal end of the lip 300j. Each lip 300j also has a material thickness MT. In the example shown, the lip height LH is at least three times the material thickness MT. This relationship results in improved performance compared to prior configurations with shorter lips or no lips. It should be understood that the lip configuration for the extension baffle 300' as shown in FIG. 15C could also be used for the lips 300j in the extension baffle 300. Further, the relationship of the lip height being three times the material thickness is also used for the lips 268 in the secondary openings 262, 266 for the upstream 250 and downstream 252 baffles. In one example, the lips 300j extend to completely surround the respective opening.

Figure 18A:
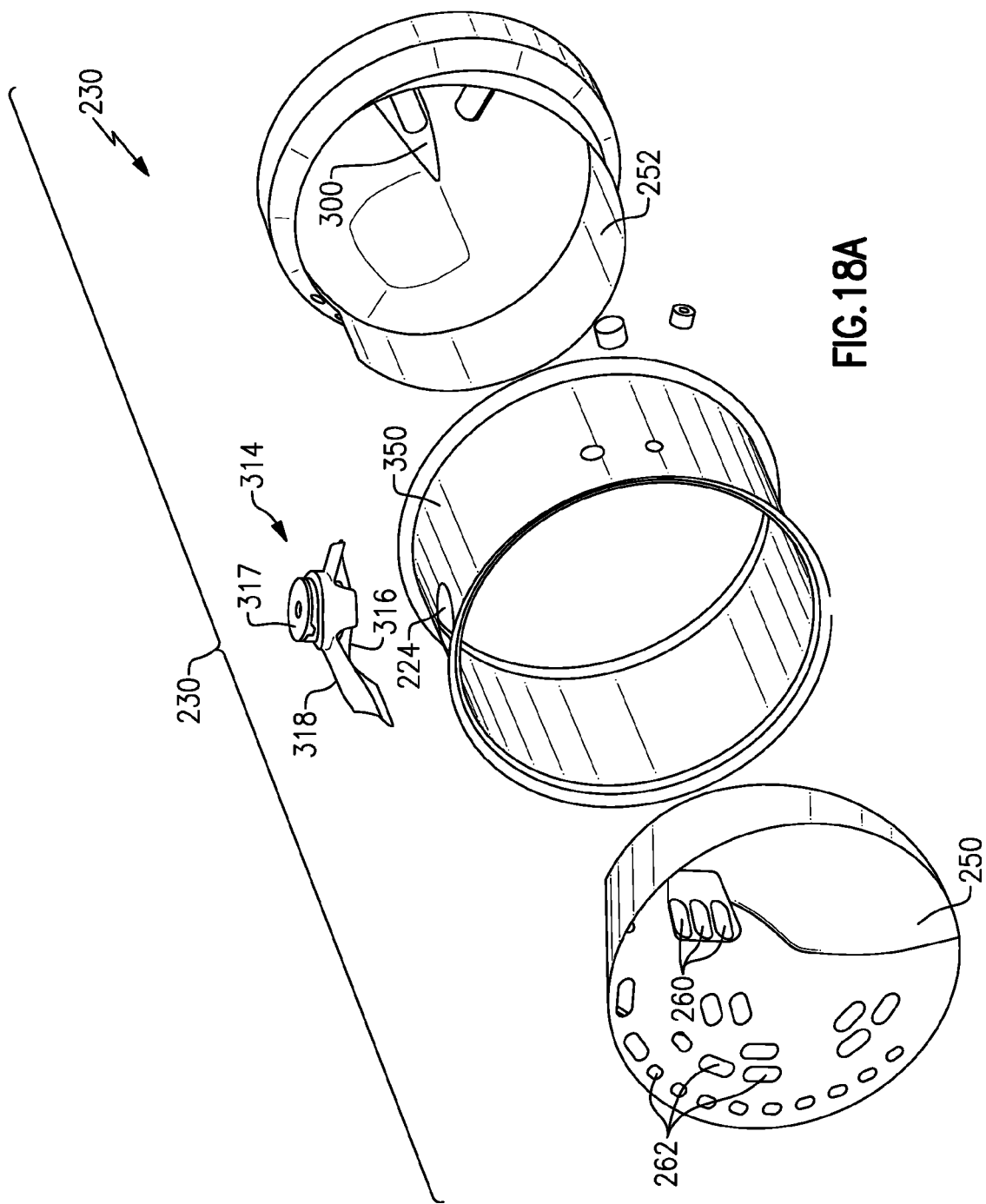
FIG. 18A is an exploded view of the mixer of FIG. 10.
Figure 18B:
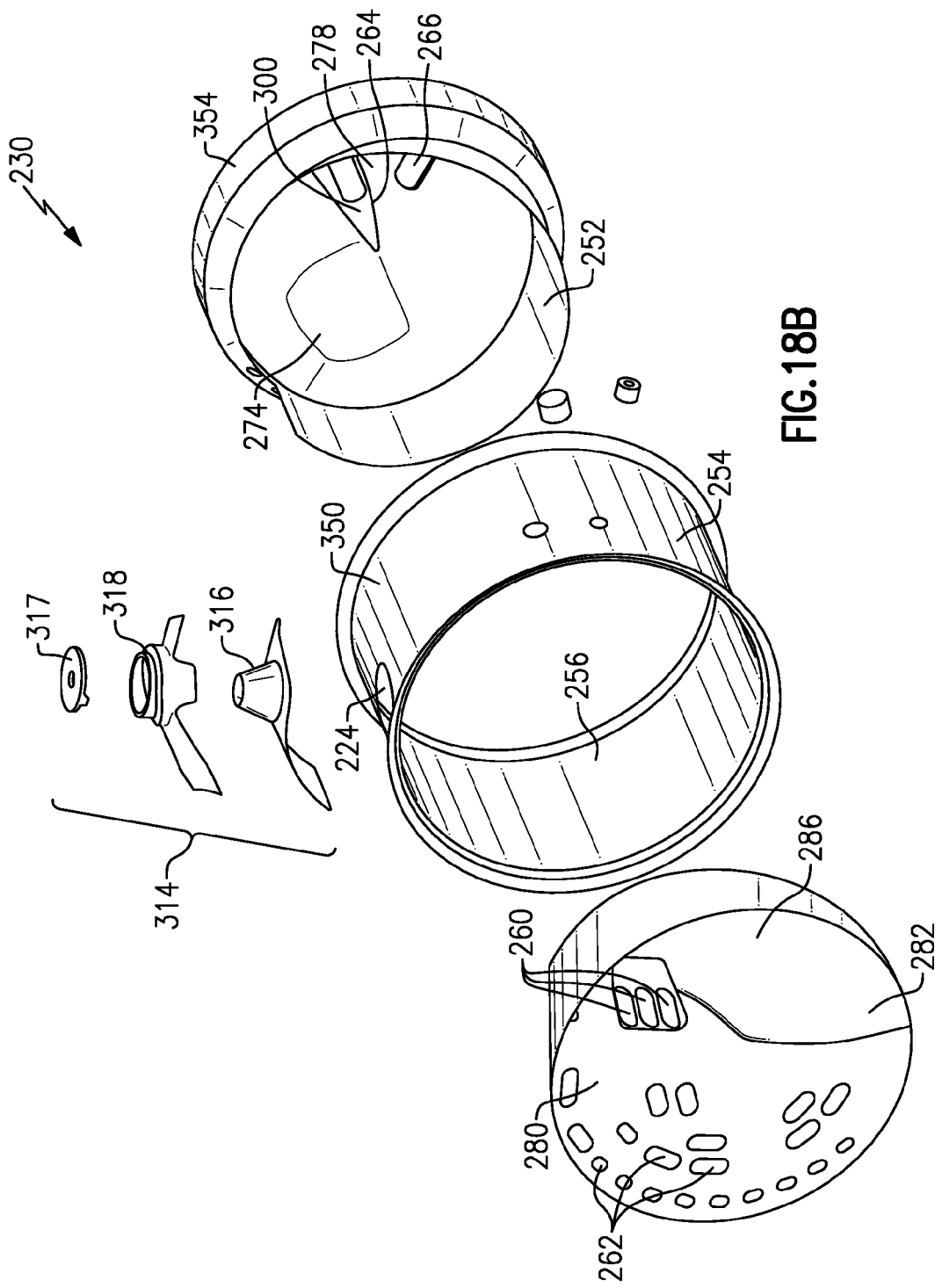
FIG. 18B is an exploded view of a sub-assembly and components as shown in FIG. 18A.
Figure 18C:
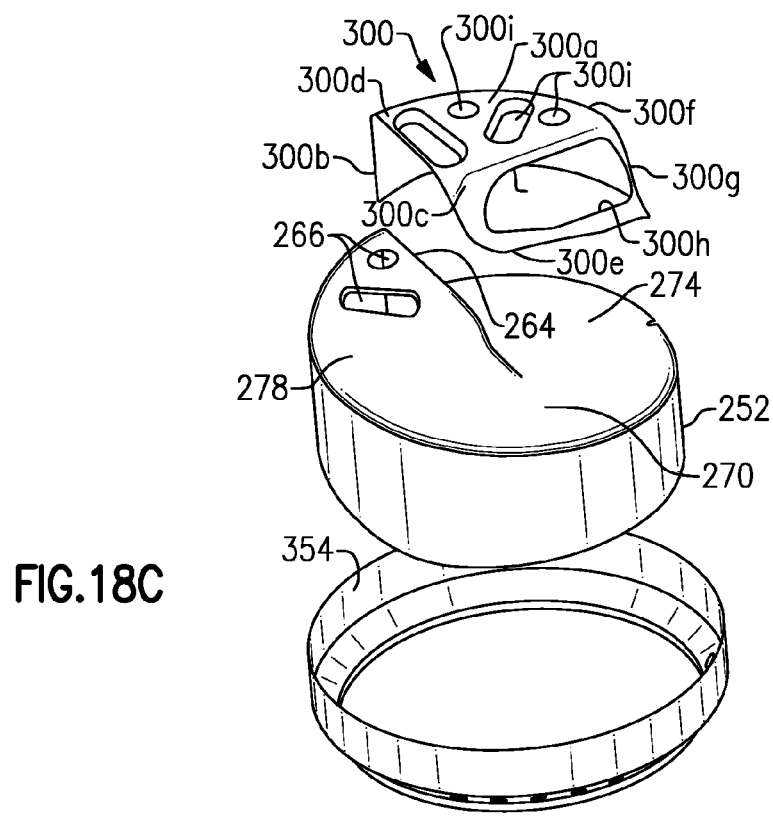
FIG. 18C is an exploded view from an outlet side of an extension baffle, downstream baffle and mounting ring from FIG. 18A.
Figure 18D:
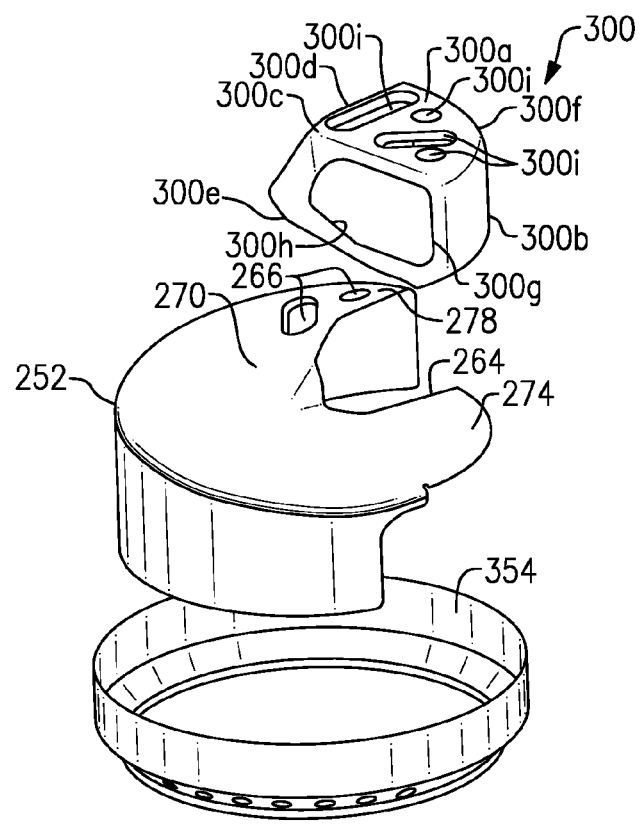
FIG. 18D is an exploded view from an outlet side of an extension baffle, downstream baffle and mounting ring from FIG. 18C.

FIGS. 18A-D show exploded views of the mixer 230 that correspond to the configuration shown in FIGS. 10-11 and 15B. The upstream baffle 250 and the downstream baffle 252 are mounted to a ring-shaped structure 350 which includes the doser opening 224. The sub-assembly 314 of the cone plate 316 and manifold 318 is associated with the doser opening 224. FIG. 18B shows an exploded view of the sub-assembly 314. A mounting plate 317 for the doser 36 is attached to the manifold 318 and cone plate 316 assembly. FIGS. 18C-D show an exploded view of the downstream baffle 252 and extension baffle 300. An additional mounting ring 354 can be used to second these components to the rest of the assembly as shown in FIGS. 18A-B.

The subject invention provides a compact mixer that allows 300 up to 480 or greater degrees of flow rotation in order to increase mixing performance and DEF transformation. Further, as discussed above, this improved performance is provided without increasing the axial length of the mixer and, further, does not adversely affect back pressure. For example, this significant amount of rotation is provided within a mixer having an overall length that is between 7 and 10 inches.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A reducing agent mixer for use with a vehicle exhaust system, the reducing agent mixer comprising
    a mixer body having a side wall arranged around a central axis to define an internal space adapted to house mixing of exhaust gas and reducing agent when the exhaust gas moves in a downstream direction through the mixer body, an upstream baffle including an upstream helical portion that extends circumferentially about and axially along the central axis and an axially extending inlet wall formed to include at least one primary inlet opening, and a downstream baffle formed to define a primary outlet opening and including a first downstream flat portion, a second downstream flat portion, and a downstream helical portion that extends circumferentially about the central axis and interconnects the first downstream flat portion and the second downstream flat portion,
    a doser configured to discharge the reducing agent through an opening of the side wall into the internal space of the mixer body, and
    a reducing agent delivery sub-assembly including an injection cone and a manifold, the injection cone having a tapered body that extends between a narrow end and a wide end thereof and an extension wall that extends outwardly away from the wide end, the manifold including an interface portion formed to define a cone-receiving cavity that receives the narrow end of the injection cone and a plurality of attachment arms coupled to the interface portion, the attachment arms formed to define a plurality of guide channels fluidly connected with the cone-receiving cavity, and the extension wall of the injection cone cooperates with the attachment arms to close the plurality of guide channels to define a plurality of guide chambers.

2. The reducing agent mixer of claim 1, further including an extension baffle including a flat extension plate arranged to be generally perpendicular to the central axis, a circumferential wall that extends axially away from the flat extension plate toward the upstream baffle and circumferentially partway about the central axis, and an axially extending side wall coupled to the flat extension plate and the circumferential wall, the downstream baffle, flat extension plate, circumferential wall, and the axially extending side wall of the extension baffle cooperate to define a primary extension inlet opening aligned with the primary outlet opening of the downstream baffle, and the axially extending side wall of the extension baffle is formed to include a primary extension outlet opening.

3. The reducing agent mixer of claim 2, wherein the flat extension plate defines an apex and includes a first edge that extends radially outward away from the apex toward the side wall of the extension baffle and a second edge that extends radially outward from the apex toward the side wall of the extension baffle and the second edge is circumferentially spaced apart from the first edge by between about 90 degrees and about 180 degrees relative to the central axis.

4. The reducing agent mixer of claim 2, wherein the plurality of attachment arms includes a first attachment arm that extends axially upstream away from the interface portion, a second attachment arm that extends circumferentially away from the interface portion, and a third attachment arm that extends circumferentially away from the interface portion opposite the second attachment arm and that turns away from the interface portion to extend axially upstream.

5. The reducing agent mixer of claim 1, wherein the at least one primary inlet opening is radially spaced apart from the central axis.

6. The reducing agent mixer of claim 1, wherein the upstream baffle further includes a first upstream flat portion that is generally perpendicular to the central axis and a second upstream flat portion that is generally perpendicular to the central axis, the second upstream flat portion is spaced apart axially from the first upstream flat portion, and the first upstream flat portion extends circumferentially about 180 degrees around the central axis.

7. The reducing agent mixer of claim 1, wherein the plurality of guide chambers includes a first guide chamber formed to define an axially-upstream facing opening and a second guide chamber formed to define a circumferentially facing opening.

8. The reducing agent mixer of claim 7, wherein the plurality of guide chambers further includes a third guide chamber formed to define an axially-upstream facing opening.

9. The reducing agent mixer of claim 7, wherein the extension wall of the injection cone extends axially downstream to the first downstream flat portion of the downstream baffle.

10. A reducing agent mixer for use with a vehicle exhaust system, the reducing agent mixer comprising
a mixer body having a side wall arranged around a central axis to define an internal space and formed to define an opening that opens into the internal space, an upstream baffle having an upstream helical portion that extends circumferentially about the central axis and axially along the central axis, and a downstream baffle axially spaced apart from the upstream baffle and including a first downstream flat portion, a second downstream flat portion axially space apart from the first downstream flat portion, and a downstream helical portion that interconnects the first downstream flat portion and the second downstream flat portion, and the downstream baffle formed to define a primary outlet opening located axially between the first downstream flat portion and the second downstream flat portion,
a doser configured to discharge reducing agent through the opening of the side wall, and
a reducing agent delivery sub-assembly including an injection cone that conducts the reducing agent discharged from the doser into the internal space of the mixer body and a manifold that includes an interface portion formed to define a cone-receiving cavity and a plurality of attachment arms that define a plurality of inwardly-opening guide channels fluidly connected with one another and the cone-receiving cavity.

11. The reducing agent mixer of claim 10, wherein the injection cone includes a tapered body that extends between a narrow end and a wide end and an extension wall that extends outwardly away from the wide end, the extension wall is arranged to close the plurality of inwardly-opening guide channels to define a plurality of guide chambers that are in fluid communication with the internal space, and the extension wall of the injection cone extends axially downstream to the first downstream flat portion of the downstream baffle.

12. The reducing agent mixer of claim 11, wherein the plurality of guide chambers includes a first guide chamber formed to define an axially-upstream facing opening and a second guide chamber formed to define a circumferentially facing opening.

13. The reducing agent mixer of claim 12, wherein the plurality of guide chambers further includes a third guide chamber formed to define an axially-upstream facing opening.

14. The reducing agent mixer of claim 10, wherein the manifold includes an inner surface and an outer surface spaced apart radially from the inner surface to locate the inner surface radially between the outer surface and the central axis and the inner surface is formed to define the plurality of attachment arms.

15. The reducing agent mixer of claim 10, wherein the upstream baffle further includes a first upstream flat portion and an axially extending inlet wall that extends between and interconnects the first upstream flat portion and the upstream helical portion and the axially extending inlet wall is formed to include a primary inlet opening.

16. The reducing agent mixer of claim 15, wherein the primary inlet opening is radially spaced apart from the central axis.

17. The reducing agent mixer of claim 15, wherein the first upstream flat portion of the upstream baffle extends circumferentially about 180 degrees around the central axis.

18. The reducing agent mixer of claim 10, further comprising an extension baffle including a flat extension plate that is generally perpendicular to the central axis, a circumferential wall that extends axially away from the flat extension plate toward the upstream baffle and circumferentially partway about the central axis, and an axially extending side wall coupled to the flat extension plate and the circumferential wall, the flat extension plate, the circumferential wall, and the axially extending side wall of the extension baffle cooperate to define a primary extension inlet opening that is aligned with the primary outlet opening of the downstream baffle, and the axially extending side wall of the extension plate is formed to include a primary extension outlet opening.

19. The reducing agent mixer of claim 18, wherein the flat extension plate defines an apex and includes a first edge that extends radially outward away from the apex toward the side wall of the extension baffle and a second edge that extends radially outward from the apex toward the side wall of the extension baffle and the second edge is circumferentially spaced apart from the first edge by between about 90 degrees and about 180 degrees relative to the central axis.

20. The reducing agent mixer of claim 18, wherein the flat extension plate includes a secondary extension opening that extends axially through the flat extension plate and a lip that protrudes axially toward the upstream baffle and the lip is arranged around the secondary extension opening.

21. The reducing agent mixer of claim 20, wherein the flat extension plate has a plate thickness measured axially relative to the central axis, the lip has a lip height measured axially relative to the central axis, and the lip height is about three times larger than the plate thickness.

\* \* \* \* \*